United States Patent [19]

Kawasaki et al.

[11] Patent Number: 4,767,921
[45] Date of Patent: Aug. 30, 1988

[54] OPTICAL PICKUP DEVICE WHEREIN THE ASTIGMATIC CONVERGED BEAM SPOT IS ALIGNED ALONG THE DIVIDING LINES OF THE FOUR-DIVISION PHOTO-DETECTOR

[75] Inventors: Ryoichi Kawasaki, Sawa; Noriyoshi Ooyama, Nitta; Masami Shimizu, Oota; Kouzou Suzuki, Ohra, all of Japan

[73] Assignee: Sanyo Electric Co., Ltd., Japan

[21] Appl. No.: 68,909

[22] Filed: Jun. 30, 1987

[30] Foreign Application Priority Data

Jul. 1, 1986 [JP] Japan .................................. 61-154814

[51] Int. Cl.$^4$ .................................................. G01J 1/20
[52] U.S. Cl. ........................................ 250/201; 369/45
[58] Field of Search ............. 250/201 PF, 201 R, 204; 369/44, 45, 46

[56] References Cited

U.S. PATENT DOCUMENTS 4,585,933 4/1986 Ando ................................ 250/201 R
4,616,354 10/1986 Yoshida .................................. 369/45

Primary Examiner—David C. Nelms
Assistant Examiner—William L. Oen
Attorney, Agent, or Firm—Darby & Darby

[57] ABSTRACT

An optical pickup device in which a laser light source is so disposed that one of two dividing lines of a photo-detector having at least four sensing portions symmetrically divided by the dividing lines so as to detect focusing deviation of a light beam onto a signal surface of a record disc, is aligned with the tangential direction of the signal track at the portion where the light beam is projected onto the signal surface, whereby the optical pickup is free from a wrong focusing control due to erroneous detection even during track jumping.

4 Claims, 6 Drawing Sheets

OPTICAL PICKUP DEVICE WHEREIN THE ASTIGMATIC CONVERGED BEAM SPOT IS ALIGNED ALONG THE DIVIDING LINES OF THE FOUR-DIVISION PHOTO-DETECTOR

BACKGROUND OF THE INVENTION

The present invention generally relates to a pickup device for optically reading signals recorded on a record medium such as a so-called compact disc or the like, and more particularly, to an optical pickup device arranged to divide or split a light path and also to produce astigmatism through employment of a half-mirror.

Conventionally, there has been provided a device arranged to optically read signals recorded on a record medium, for example, in the form of a record disc through employment of an optical pickup. As one typical example of the optical pickup devices as referred to above, there is known a so-called CD player adapted to reproduce or play a compact disc (i.e. CD) having, on its signal surface, dents or concave portions called pits continuously formed to correspond to digital signals. In the CD player as referred to above, it is necessary to effect a focusing control in which a light beam produced by the optical pickup device is controlled in a direction of an optical axis or a so-called focusing direction in order to accurately converge the light beam onto the signal surface of the disc, and also, to effect a tracking control in which the light beam is controlled in a radial direction of the disc or a so-called tracking direction in order to cause the light beam to follow the signal track on the signal surface of the disc.

Incidentally, in the CD player, a practice to control positions of an objective lens for the optical pickup device has been generally adopted for the focusing control and tracking control, and it has been a recent trend that many CD players employ an astigmatic method for the focusing control, and a three-beam method for the tracking control as disclosed, for example, in Japanese Patent Laid-Open Application Tokkaisho No. 60-209974.

In the astigmatic method as referred to above, it is so arranged that, through employment of a cylindrical less and a half-mirror, astigmatism is produced in the light reflected by the signal surface of the disc and passing through a predetermined light path within the optical pickup device, and such reflected light is irradiated onto a main detecting portion D1 of a photo-detector having four sensing portions or sensors symmetrically divided by two axes or dividing lines D1a as shown in FIG. 8, thereby to detect focusing deviation onto the signal surface by the light beam through calculation processing of outputs of the respective sensors of said main detecting portion D1.

More specifically, in the case where the focusing point of the light beam is aligned with the signal surface of the disc, i.e. in the state of in-focus, the light spot of the reflected light irradiated onto the main detecting portion D1 of the photo-detector is in a state as shown in a solid line in FIG. 8, with outputs S1, S2 S3 and S4 of the respective sensors becoming equal to each other. Meanwhile, when the focusing point of the light beam is located in a position before the signal surface of the disc, the light spot of the reflected light as projected onto the main detecting portion D1 of the photo-detector is in a state as shown in a one-dot chain line (or two-dot chain line) in FIG. 8, and the outputs S1 and S3 (or S2 and S4) of the sensors disposed on a diagonal line are large, with the outputs S2 and S4 (or S1 and S3) becoming small. On the contrary, in the case where the focusing point of the light beam is located at a position behind the signal surface of the disc, the light spot of the reflected light as projected onto the main detecting portion D1 of the photo-detector is in a state as shown in the two-dot chain line (or one-dot chain line) in FIG. 8, and the outputs S2 and S4 (or S1 and S3) of the sensors disposed on the diagonal line are large, with the outputs S1 and S3 (or S2 and S4) becoming small. Therefore, by effecting calculation processing for $(S1+S3) - (S2+S4)$ of the respective sensor outputs S1, S2, S3 and S4 of the main detecting portion D1, it is possible to obtain a focusing error signal indicative of deviation in the focusing by the light beam onto the signal suface, and thus, the focusing deviation on the signal surface by the light beam can be detected.

Meanwhile, in the three-beam method, it is so arranged that a light beam (laser light) emitted from a light source (generally of a laser diode) is diffracted through employment of a diffraction grating so as to prepare two sub-beams from said light beam besides the main beam, and the light of the sub-beams reflected by the signal surface of the disc is projected onto sub-detecting portions D2 and D3 provided at front and rear sides of the main detecting portion D1 of the photo-detector divided into four sensing portions as described previously with reference to FIG. 8, and disclosed in Japanese Patent laid-Open Application Tokkaisho No. 60-209974, and by subjecting to calculation processing, a difference between outputs S5 and S6 from the respective sensors constituting the sub-detecting portions D2 and D3, the tracking deviation of the light spot onto the signal surface for the light beam (main beam) is detected.

More specifically, in the case where the light spots of the light beam are correctly positioned on the signal track of the signal surface, such light spots of the two sub-beams cover the signal track by an equal extent, and thus, the outputs S5 and S6 of the respective sensors for the sub-detecting portions D2 and D3 become equal to each other. When the light spots are positioned in a deviated state at one direction side of the signal track, one of the light spots of the two sub-beams covers a wider (or narrower) range than the other light spot, and thus, the output S5 becomes larger (or smaller) than the output S6, while in the case where the light spots are located in a deviated state at the other direction side of the signal track, one of the light spots of the two sub-beams covers a wider (or narrower) range than the other light spot, and thus, the output S5 becomes smaller (or larger) than the output S6. Therefore, by subjecting to calculation processing, the difference in the outputs of the respective sensors for the sub-detecting portions D2 and D3, the tracking deviation of the light spot for the main light beam can be detected.

Incidentally, it has been a recent trend that CD players are formed into various types, for example, a portable type, a vehicle mounting type, or a type incorporated in a radio-cassette tape recorder, etc. Each of the CD players of the above described types must be compact in size as an appliance itself, since a sufficient space is not available for disposing the optical pickup device as in a stationary type CD player, and thus, the optical pickup device has been reduced in its size, following the diversification in the types of the CD player. Therefore, at the present stage, the optical pickup device based on the astigmatic method in the focusing control through employment of a half-mirror has increasing in number, owing to the fact that the half-mirror can serve the purposes both for a half prism for light path splitting which has been conventionally used, and also for a cylindrical lens having a light condensing capacity only in one direction for producing the astigmatism of the reflected light.

FIG. 9 shows a perspective view of an optical system for a conventional optical pickup device using a half-mirror.

In FIG. 9, the light beam (laser light) generated by a laser diode LD is diffracted by a diffraction grating GD so as to be formed into three beams, i.e. a main beam and two sub-beams, and is thereafter reflected by the surface of a half-mirror M inclined by 45° with respect to an optical axis of the light beam and also, with respect to a record medium, for example, a compact disc CD disposed in parallel relation with respect to said optical axis, and thus, the optical axis is directed to be perpendicular to the signal surface of the disc CD. The light beam thus rejected by the half-mirror M is incident upon an objective lens LO after being formed into a parallel light by a collimator lens LC, and converged by the objective lens LO to be projected onto the signal surface of the disc CD. The light beam thus projected onto the signal surface, is reflected by said signal surface, and returned, as reflected light, to the half-mirror M via the objective lens LO and collimator lens LC so as to be transmitted through said half-mirror M. In the above case, astigmatism is produced in the reflected light depending on the thickness of the half-mirror M, and refraction index and angle of inclination thereof. The reflected light which has transmitted through said half-mirror M is adjusted for the way of generation of astigmatism by a concave lens LV for subsequently being projected onto a photo-detector DP. Here, the photo-detector DP is so disposed that one of the diagonal lines of the main detecting portion D1 thereof (FIG. 8) is aligned with the direction of the optical axis of the light beam directed from the laser diode LD to the half-mirror M. More specifically, the half mirror M is disposed at an angle so that the distance thereof from the disc CD is not constant, and since the reflected light from the disc CD incident upon the half-mirror M has an area, and is of a converged light instead of a parallel light, astigmatism is produced owing to the fact that the angle of incidence of said reflected light is different according to the incident positions thereof upon the half-mirror M, and that the light spot of the reflected light projected onto the photo-detector DP is expanded or contracted in the direction of optical axis and in a vertical direction with respect to said optical axis direction due to the fact that the focusing point of the light beam is deviated form the signal surface of the disc CD.

In the actual construction, the known optical pickup device is generally so arranged that, with an objective lens being disposed within a lens holder (not shown), the lens holder is supported so as to be freely movable in the tracking direction and focusing direction for consequent movement of the objective lens to predetermined positions, and for a support member for supporting the lens holder, said lens holder is formed to be long in a tangential direction of the signal track recorded on the disc. Accordingly, since the lens holder as described above is formed into a rectangular shape or a shape close thereto, having its sides in the above tangential direction and the radial direction of the disc, in the base (not showr) of the optical pickup device for holding various optical parts at predetermined positions, a portion of said base projected to form the optical path from the laser diode LD to the half-mirror M is aligned with the corresponding side portion of said lens holder for the facilitation of designing and also for convenience of forming adjusting openings for adjusting the optical parts.

Incidentally, as disclosed in Japanese Patent Laid-Open Application Tokkaisho No. 57-44236, in the case where the light spot of the light beam is not correctly located on the signal track, i.e. when the tracking is deviated, light intensity distribution within the light spot as projected onto the photo-detector becomes not uniform. This is attributable to the fact that, in the light beam projected onto the signal surface of the disc, light intensity of the reflected light becomes weak at the portion where the light spot of the light beam contacts the pits formed on the signal surface of the disc. Therefore, in the conventional optical pickup device in FIG. 9, during track jumping as in tune searching, the value of the calculation processing for $(S1+S3)-(S2+S4)$ of the outputs S1, S2, S3 and S4 produced from the main detecting portion D1 of the photo-detector shown in FIG. 8 does not become Zero so as to be undesirably regarded as the focusing point deviation of the light beam on the signal surface.

More specifically, since the tangential direction of the signal track of the disc CD at the portion to which the light beam is projected, and the dividing line D1a of the photo-detector form an angle of 45° therebetween, and the light intensity of the light spot of the light beam projected onto the main detecting portion D1 is not uniform, when the light spot is deviated from the center of said main detecting portion D1 due to the track jumping effected, the portion of the light spot strong (or weak) in the light intensity is moved at the angle of 45° with respect to the dividing line D1a of the main detecting portion D1, i.e. in the direction of a line A—A' or B—B' in FIG. 10, and therefore, even in a round circle, the sums of the outputs of the optical sensors on the respective diagonal lines of the main detecting portion D1 become unequal to each other. Accordingly, during the track jumping, even when the focusing is achieved, focusing control is undesirably effected by the difference in the sums of the outputs from the sensors on the respective diagonal lines, consequently giving rise to the focusing deviation of the light beam on the signal surface.

SUMMARY OF THE INVENTION

Accordingly, an essential object of the present invention is to provide an improved optical pickup device which is free from wrong focusing control due to erroneous detection during track jumping.

Another important object of the present invention is to provide an optical pickup device of the above described type which is simple in construction and stable in functioning, and can be readily manufactured at low cost.

The present invention is characterized in that a laser light source is disposed to generate laser light having an optical axis at an angle of 45° with respect to the tangential direction of the signal track at the portion where the light beam is projected onto the signal surface, with a half-mirror being also disposed to correspond thereto, whereby one of the dividing lines of a photo-detector divided into four sensing portions for detecting focusing deviation of the light beam on the signal surface is aligned with said tangential direction.

In the present invention, by aligning one of the dividing lines of the photo-detector with the tangential direction of the signal track as described above, generation of erroneous signals for focusing through calculation processing of the outputs from the photo-detector during track jumping is advantageously prevented.

In other words, the present invention is characterized in the arrangement that, in an astigmatic pickup which utilizes a plane-parallel plate or parallel flat plate (i.e. a half-mirror), generation of wrong focusing error signals which are to be produced during tracking adjustment is prevented.

In accomplishing these and other objects, according to one preferred embodiment of the present invention, there is provided an optical pickup device which includes a light source, an optical member for leading at least part of a light beam emitted from the light source onto the surface of a record medium e.g. a compact disc or the like and at least another part of the light beam reflected by the surface of the record medium onto a photo-detector divided into four sensing portions separated symmetrically by two dividing lines, and also for introducing astigmatism into the reflected light bean led into said four-division photo-detector, an objective lens which converges the emitted light beam led by the optical member onto the surface of the record medium as a light spot, and a control means for controlling positions of the converged spot with respect to the surface of the record medium by driving said objective lens. The four-division photo-detector is so disposed that, upon displacement of the converged light spot in a diametrical direction of the record medium by the control means, the direction of displacement of the reflected light beam on the four-division photo-detector is aligned with the direction of one of the two dividing lines of the four-division photo-detector, and the optical member is so disposed that the direction of the astigmatism produced on the four-division photo-detector in response to variation of a distance between the objective lens and the record medium surface is aligned with a direction which bisects an angle formed between the two dividing lines.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
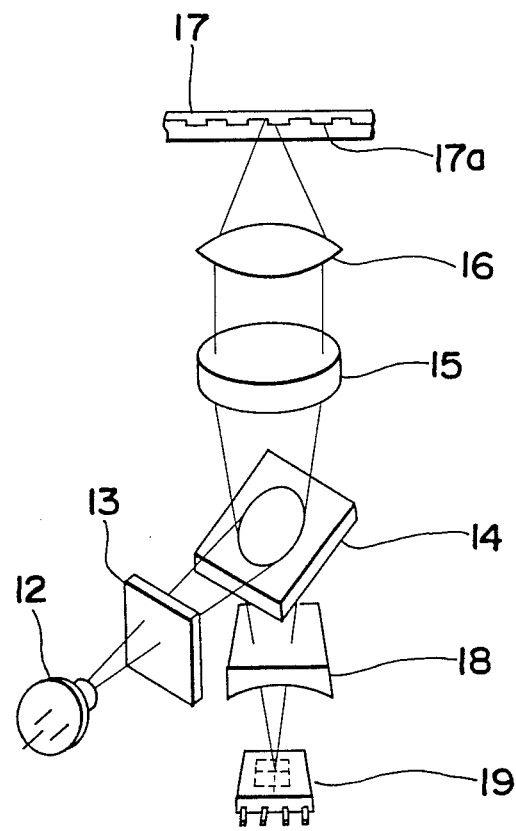
FIG. 1 is a schematic perspective view of an optical pickup device according to one preferred embodiment of the present invention.

Before the description of the present invention proceeds, it is to be noted that like parts are designated by like reference numerals throughout the accompanying drawings.

Referring now to the drawings, there is shown in FIG. 1, the construction of an optical system of an optical pickup device according to one preferred embodiment of the present invention. The optical pickup device of FIG. 1 generally includes a laser diode 12 as a light source for emitting a light beam (laser light), a diffraction grating 13 for diffracting the light beam emitted from the laser diode 12, a half-mirror 14 for splitting the light path and also for producing astigmatism, a collimator lens 15 for transforming the light beam reflected by the half-mirror 14 into a parallel light, an objective lens 16 for converging the light beam onto a signal track on the signal surface or information track 17a of a record medium such as a disc 17 or the like, a concave lens 18 for adjusting astigmatism of the reflected light from the disc 17 transmitted through said half mirror 14, and a photo-detector 19 for detecting deviations in focusing of the light beam onto the signal track, and also, detecting deviations in tracking, similar to the photo-detector DP earlier described with reference to FIGS. 8 and 9.

Figure 9:
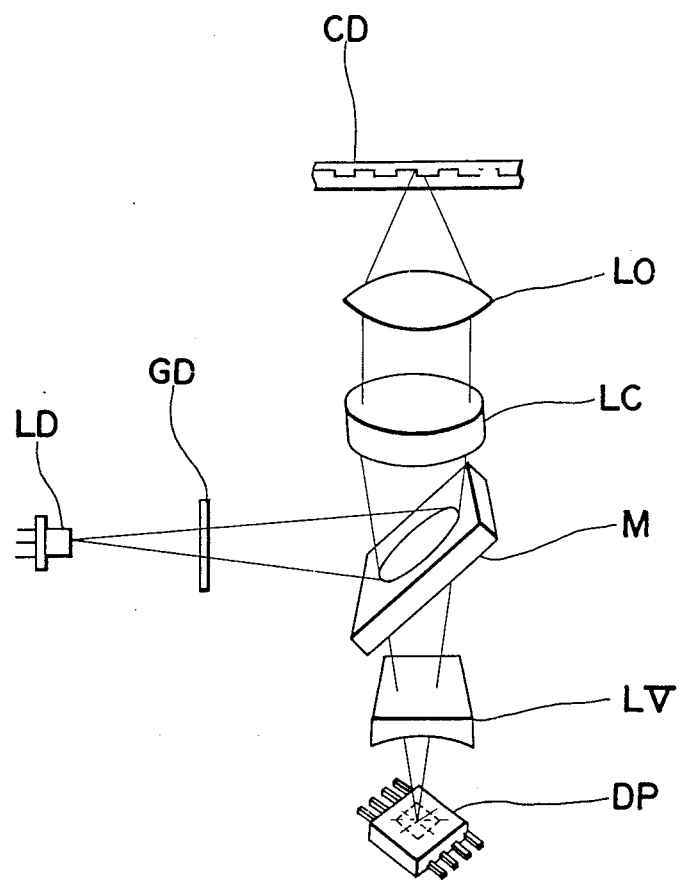
FIG. 9 is a schematic perspective view showing an optical system of a conventional optical pickup device (already referred to)

The light beam emitted from the laser diode 12 is diffracted by the diffraction grating 13 in the similar manner as in the conventional arrangement in FIG. 9 for being divided into three beams i.e. a main beam and two sub-beams, and thereafter, half of the light amount is reflected by the surface of the half-mirror 14 so as to be directed toward the disc 17. More specifically, the light beam reflected by said half-mirror 14 is incident upon the objective lens 16 after being formed into the parallel light by the collimator lens 15, and is converged by said objective lens 16 so as to be projected onto the signal surface 17a of the disc 17. The light beam projected onto the signal surface 17a is reflected thereby, and is returned to the half-mirror 14 through the objective lens 16 and the collimator lens 15. The reflected light thus returned to the half-mirror 14 is half transmitted through said half-mirror 14 this time, and formed with the astigmatism. The reflected light which has transmitted through said half-mirror 14 is projected onto the photo-detector 19 through the concave lens 18. Therefore, it becomes possible to focus the light beam onto the signal track of the disc 17 through driving of the objective lens 16 to a predetermined position by subjecting the output signal obtained from respective sensors of the photo-detector 19, to calculation processing so as to use the output signals thus processed, and also to read the signal recorded on the disc.

Figure 4:
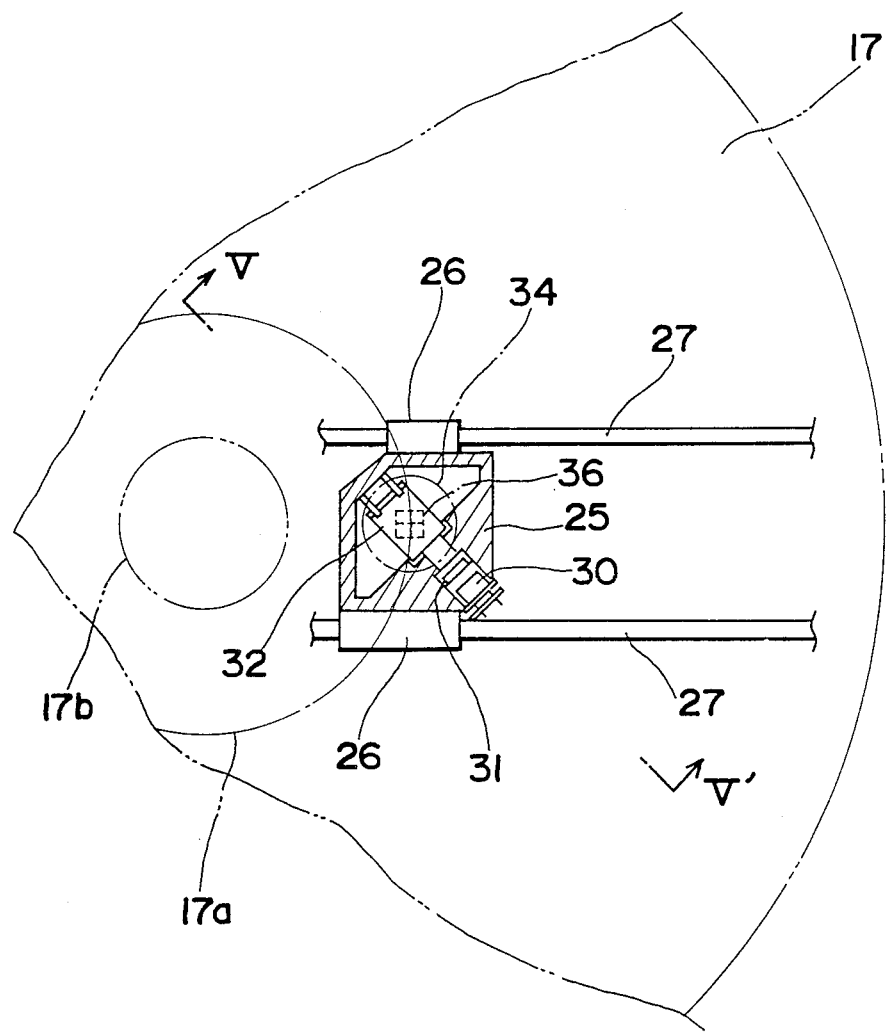
FIG. 4 is a schematic diagram showing positional relation between the optical pickup and information track of a record medium according to the present invention.
Figure 5:
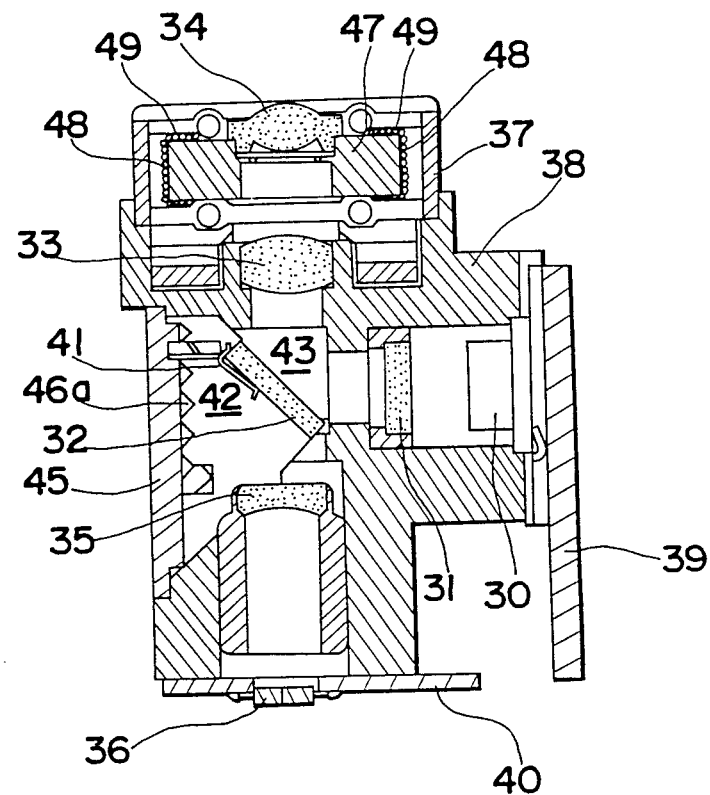
FIG. 5 is a cross section taken along the line V—V' in FIG. 4.
Figure 6:
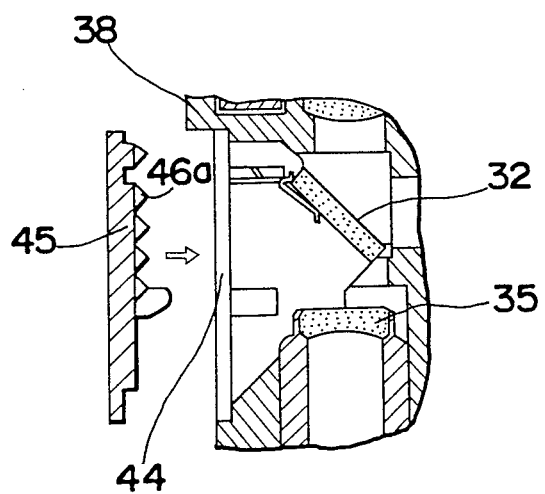
FIG. 6 is a fragmentary cross section showing a part of FIG. 5 on an enlarged scale for explaining the function thereof.
Figure 7:
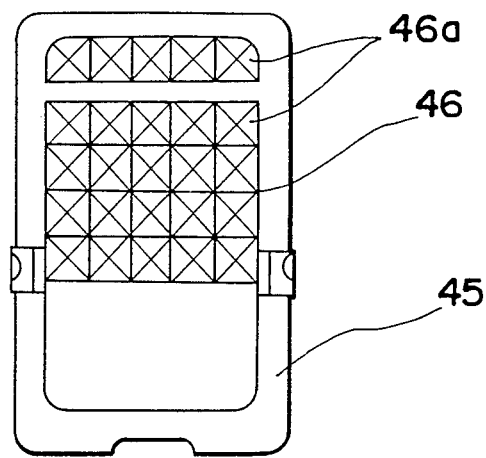
FIG. 7 is a top plan view showing a blocking plate employed in the arrangement of FIGS. 5 and 6.

Referring further to FIG. 4, there is shown a schematic diagram illustrating general positional relation between the information track 17a and a central opening 17b of the disc 17 and the optical pickup 25 for actual application, which is slidably mounted on guide shafts 27 through a set of bearings 26 provided on the main body of said pickup. Specific constructions of the pick-up 25 are shown in FIGS. 5 through 7.

In FIGS. 4 to 7, the optical pickup 25 for the actual application includes a laser diode 30 as a light source for emitting a light beam (laser light), a diffraction grating 31 for diffracting the light beam emitted from the laser diode 30, a half-mirror 32 for splitting the light path and also for producing astigmatism, a collimator lens 33 for transforming the light beam reflected by the half-mirror 32 into a parallel light, an objective lens 34 for converging the light beam onto a signal track 17a on the signal surface of disc 17, a concave lens 35 for adjusting astigmatism of the reflected light from the disc 17 transmitted through said half mirror 32, and a photo-detector 36 for reading information signal recorded on the disc, and for detecting deviations in focusing of the light beam onto the signal track, and also, detecting deviations in tracking.

The objective lens 34 is mounted on a two-axis driving mechanism 37 for driving the objective lens 34 in the two-axis directions, i.e. in the tracking direction of the disc and the focusing direction of the light beam. Meanwhile, the diffraction grating 31, half-mirror 32, collimator lens 33 and concave lens 35 are fixed to a base 38 made of aluminum die cast or the like, and disposed at predetermined positions. To the above base 38, a base plate 39 to which the laser diode 30 is fixed and a base plate 40 to which the photo-detector 36 is fixed, are secured together with the two-axis driving mechanism 37.

Incidentally, the half-mirror 32 is depressed from its one face, by a plate spring 41 disposed not to block the light path of the light beam, while opposite edges of its other face are engaged with a portion 43 having a thick wall in a space 42 of the base 38 so as to be fixed at a predetermined position. More specifically, the base 38 is formed with a attaching hole 44 for attaching the half mirror 32 as shown in a fragmentary cross section of FIG. 6. This attaching hole 44 is closed by a blocking plate 45 after the half-mirror 32 has been fixed therein. Since the blocking plate 45 only requires an accuracy for closing said attaching hole 44, it is made, for example, of a synthetic resin material such as ABS resin or the like which can be readily molded, and is provided with projections 46a, for example, of square conical shape over an entire surface 46 confronting the laser diode 30 through the half-mirror 32, thereby to form an irregular reflection surface. Moreover, the blocking plate 45 is colored in black for a high absorption rate.

The functioning of the optical pickup 25 having the construction as described above will be described hereinbelow with reference to FIG. 5.

As also described earlier with reference to FIG. 1, the light beam produced by the laser diode 30 is diffracted by the diffraction grating 31 for being divided into three beams i.e. a main beam and two sub-beams, and thereafter, reflected by the surface of the half-mirror 32 so as to be directed toward the disc 17. More specifically, the light beam reflected by said half-mirror 32 is incident upon the objective lens 34 after being formed into the parallel light by the collimator lens 33, and is converged by said objective lens 34 so as to be projected onto the signal surface of the disc 17. The light beam projected onto the signal surface is reflected thereby, and is returned to the half-mirror 32 through the objective lens 34 and the collimator lens 33. The reflected light thus returned to the half-mirror 32 is transmitted through said half-mirror 32 this time, and formed with the astigmatism. The reflected light which has transmitted through said half-mirror 32 is projected onto the photo-detector 36 through the concave lens 35. Therefore, by subjecting to calculation processing, the output signals obtained from the respective sensors of the photo-detector 36, and by feeding control signals corresponding to the output signals thus processed into a focusing coil 48 wound around a lens holder 47 of the two-axis driving mechanism 37, and also into a tracking coil 49 to drive said lens holder 47, the objective lens 34 is driven to the predetermined positions so that the light beam is focused onto the signal track of the disc, and thus, the signals recorded on the disc may be read.

Incidentally, the light beam in the reflecting direction of the half-mirror 32, which is projected onto the half-mirror 32 from the laser diode 30 through the diffracting grating 31, is reflected by the surface of the half-mirror 32 by about half of its light amount for being directed toward the disc, while the remaining about half of its light amount is transmitted through said half-mirror 32 so as to be projected onto the blocking plate 45. Here, since the portion of the blocking plate 45 forming the surface confronting the laser diode 30 through the half-mirror 32, is formed with the protrusions 46a in the form of square conical shape over the entire surface to provrde the irregular reflection surface 46 thereon as described earlier, the light projected onto said blocking plate 45 is subjected to irregular reflection by said surface 46. Moreover, since the blocking plate 45 is composed of the black synthetic resin material, the light amount to be reflected by said blocking plate 45 is also reduced. Therefore, the light reflected by said blocking plate 45 is almost deviated from the light path of information light required for reproduction of data signals recorded on the disc, and also form that required for driving the objective lens 34.

It should be noted here that in the above embodiment of FIGS. 4 to 6, the protrusions 46a of the square conical shape are formed to provide the irregular reflection surface of light on the blocking plate 45, but the shape of such protrusions may be modified in various ways so far as the light irregular reflection surface can be provided thereby, and that the half-mirror employed as an optical part for splitting the optical path in the above embodiment may be replaced by a half-prism to obtain the similar effect.

Figure 2:
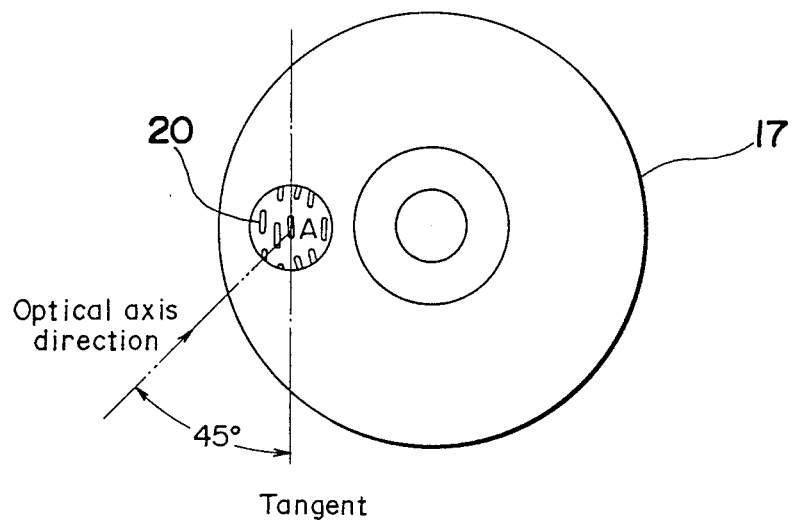
FIG. 2 is a diagram for explaining the disposition of a laser light source according to the present invention.
Figures 3A, 3B:
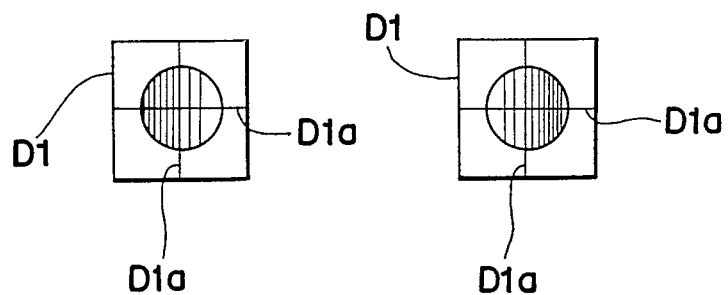
FIGS. 3(a) and 3(b) are diagrams showing a photo-detector for explaining distribution of light intensity of light spot in the present invention.
Figure 8:
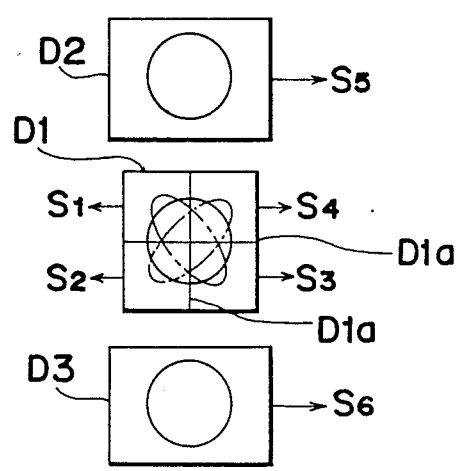
FIG. 8 is a top plan view of a photo-detector for explaining detection of focusing deviation of the light beam onto the signal surface of a disc or the like based on an astigmatic method, and detection of tracking deviation of the light beam onto the signal track by a three-beam method (already referred to)
Figure 10:
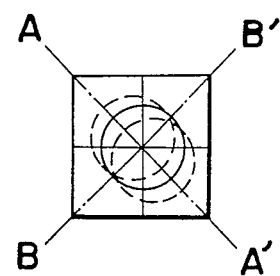
FIG. 10 is a schematic diagram of a photo-detector of the conventional optical pickup device for explaining deviation of the light beam projected thereonto during track jumping, and distribution of light intensity of the light spot thereon (already referred to).

Referring back to FIGS. 1 to 3, in the optical pickup device as illustrated, the laser diode 12 as the light source is disposed on a two-dot chain line in FIG. 2 so that the optical axis of the light beam emitted from said laser diode 12 has an angle of 45° with respect to the tangential direction (indicated by a one-dot chain line in FIG. 2) of the signal track (composed of pits 20 continuously formed) at the portion (represented by a point A in FIG. 2) on the disc 17 to which the light beam is projected, with the diffraction grating 13 and the half mirror 14 being disposed to correspond thereto as shown in FIG. 1. Accordingly, in the reflected light which has transmitted through the half-mirror 14, astigmatism expanding or contracting in the direction at an angle of 45° with respect to said tangential direction, is produced, and therefore, the photo-detector 19 is so disposed that one of the two dividing lines or axes D1a which divide the main detecting portion D1 thereof into four sensing portions as in FIG. 8, is aligned with said tangential direction. Accordingly, the light spot of the reflected light as projected onto the main detecting portion D1 of the photo-detector 19 presents such light intensity distribution that, when the light beam crosses the signal track, variation in the light intensity is produced in a direction perpendicular to said tangential direction as shown in FIG. 3(a) and 3(b), while said light spot comes to be displaced along the dividing lines D1a of the main detecting portion D1 due to deviation in the position in which the light beam is projected onto said main detecting portion D1, and thus, if the light beam is in focus with respect to the signal surface 17a, even when the light spot is deviated from the center of the main detecting portion D1 during track jumping, sums of the outputs of the sensors on the respective diagonal lines of the main detecting portion D1 become equal to each other. Therefore, if the light beam is in focus with respect to the signal surface 17a, no focusing error signal is produced from the circuit which subjects the outputs from the photo-detector to the calculation processing during the track jumping.

As is clear from he foregoing description, according to the optical pickup device of the present invention, since the laser light source is so disposed that one of the dividing lines of the photo-detector which is divided into four detecting portions for detecting focusing deviation of the light beam onto the signal surface of the disc, is aligned with the tangential direction of the signal track at the portion where the light beam is projected onto the signal surface, there is such an advantage that the optical pickup is free from a wrong focusing control due to erroneous detection during the track jumping.

Although the present invention has been fully described by way of example with reference to the accompanying drawings, it is to be noted here that various changes and modifications will be apparent to those skilled in the art. Therefore, unless otherwise such changes and modifications depart form the scope of the present invention, they should be construed as included therein.

What is claimed is:

1. An optical pickup device which comprises a light source (12,30), and optical member (14,32) for leading at least part of a light beam emitted from the light source onto the surface of a record medium (17) and at least another part of the light beam reflected by the surface of the record medium onto a photo-detector (19,36) divided into four sensing portions separated symmetrically by two dividing lines (D1a), and also for introducing astigmatism into the reflected light beam led into said four-division photo-detector (19,36), and objective lens (16,34) which converges the emitted light beam led by said optical member (14,32) onto the surface of the record medium as a light spot, and a control means for controlling positions of the converged spot with respect to the surface (17a) of the record medium (17) by driving said objective lens (16,34), said four-division photo-detector being so disposed that, upon displacement of said converged light spot in a diametrical direction of said record medium by said control means, the direction of displacement of the reflected light beam on said four-division photo-detector (19,36) is aligned with the direction of one of said two dividing lines (D1a) of said four-division photo-detector (19,36), said optical member (14,32) being so disposed that the direction of the astigmatism produced on said four-division photo-detector in response to variation of a distance between said objective lens (16,34) and said record medium surface is aligned with a direction which bisects an angle formed between said two dividing lines (D1a).

2. An optical pickup device as claimed in claim 1, wherein said optical member (12,30) is of a parallel flat plate of light transmitting nature.

3. An optical pickup device as claimed in claim 2, wherein said light source (12,30) is of a semi-conductor laser.

4. An optical pickup device which comprises a parallel flat plate (14,32) for dividing a light path, and also for producing astigmatism thereby, and a photo-detector (19,36) divided into four sensing portions separated symmetrically by two dividing lines (D1a) for detecting focusing deviation of a light beam onto the surface (17a) of a record disc (17) through utilization of said astigmatism, said optical pickup device further comprising a laser light source (12,30) which is so disposed as to emit laser light having its optical axis at an angle of 45° with respect to the tangential direction of an information track at the portion on said record disc surface (17a) where said light beam is projected, said parallel flat plate being disposed to reflect the laser light so as to be incident upon said information track, said four-division photo-detector (19,36) being so disposed as to receive the light transmitted through said parallel flat plate (14,32), of the reflected light from said information track and also in such a manner that one of said two dividing lines (D1a) of said four-division photo-detector (19,36) is aligned, in its direction, with said tangential direction, whereby the direction of the astigmatism produced by said parallel flat plate (14,32) in response to said focusing deviation is formed on a bisector of an angle formed by said dividing lines (D1a), and upon displacement of the light beam in a direction intersecting at right angles with said information track based on the tracking control, the light beam on said photo-detector (19,36) is displaced, in response thereto, in the direction of one of said two dividing lines (D1a).

* * * * *